United States Patent Office 3,260,621
Patented July 12, 1966

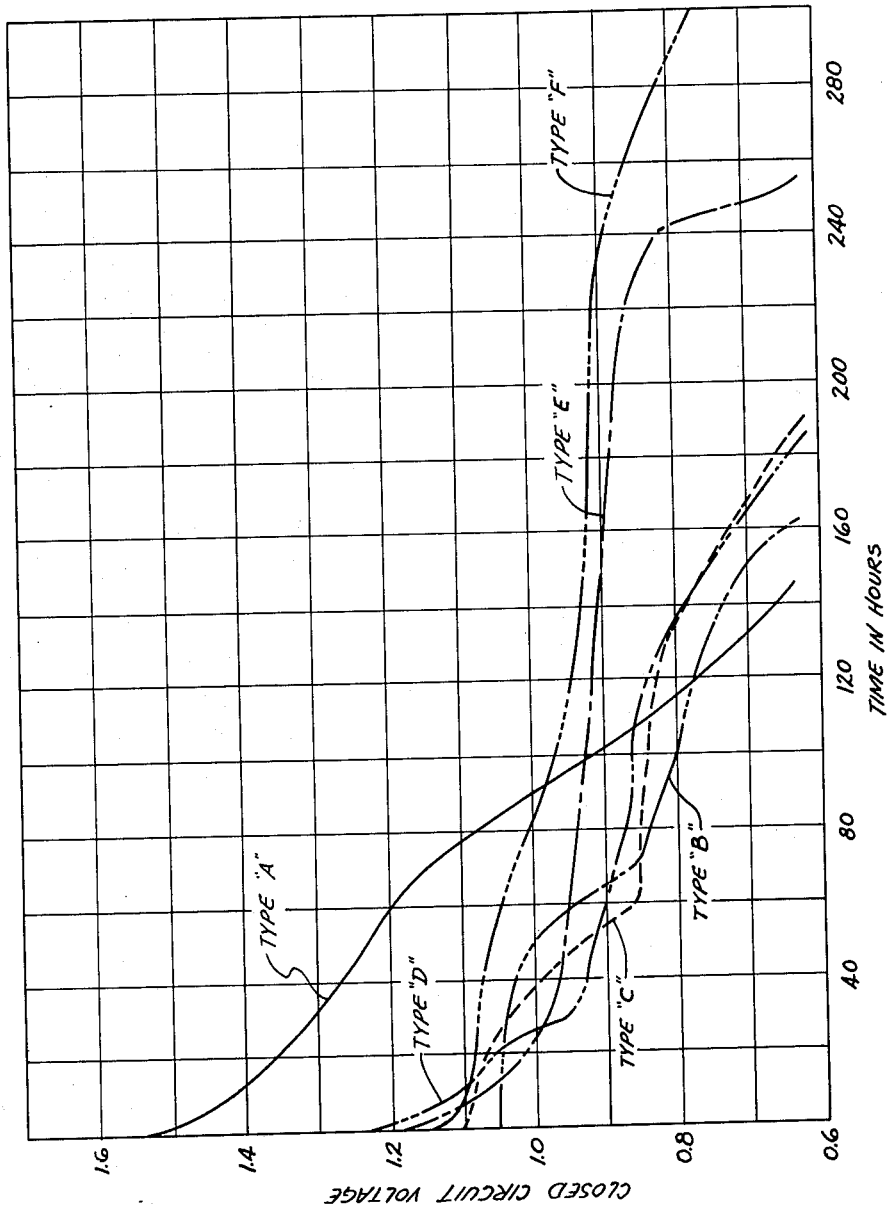

3,260,621
DRY CELL BATTERIES AND POLYNUCLEAR POLYBENZOFURAZAN OXIDE DEPOLARIZING COMPOUNDS THEREFOR
John T. Shaw, Springfield, Mass., John D. Voorhies, New Canaan, Conn., and Stanley M. Davis, Somerville, N.J., assignors to American Cyanamid Company, Stamford, Conn., a corporation of Maine
Filed Aug. 30, 1965, Ser. No. 483,756
12 Claims. (Cl. 136—137)

This is a continuation-in-part of application Serial No. 237,811, filed November 15, 1962, now abandoned in favor of the present application.

This invention relates to improved battery compositions for primary electric cells, and new compounds incorporated in such cells. More particularly, it is concerned with new depolarizing agents and with improved cathodic mixes containing the same, and with primary cells manufactured therewith. While the invention relates essentially to primary cells, the cells may be partially reactivated by charging, extending the useful life, even though the cell is not fully reversible as in a true secondary battery.

More specifically, the invention relates to polyfurazan oxides which have at least one furazan oxide moiety attached to each of at least two benzo rings, with the benzo rings being linked by a bridge group, intermediates therefor, methods of preparation and also to cathode mixes, which mixes include the above compounds as well as compounds having benzo rings linked directly.

The benzo rings may contain additional substituents such as lower alkyl groups, lower alkoxy groups, chloro groups, or nitro groups. Such substitution adds to the molecular weight, and results in variants without specific advantages in dry cells. The present compounds have fungistatic activity, and such substituents are apt to have more effect in changing fungistatic activity than on dry cell utility.

Nomenclature in the field is varied. The compounds can be considered as a derivative of an oxide of benzofurazan, listed as number 1058 in "The Ring Index," 2nd edition, A. M. Patterson, L. T. Capell and D. F. Walker, American Chemical Society, Washington, D.C., 1960 (abbreviated R.R.I.). R.R.I. number 2167, benzofuroxan or benzofurazan oxide is also listed in that index. Conventional nomenclature and formulae are somewhat confusing, as the furazan ring shares electrons with the benzene ring, and would indicate that the benzenoidal conjugation is destroyed. Actually, the benzenoid ring remains aromatic in character, even if some electrons are shared with the furazan ring or rings.

The nomenclature here used is regarded as the most informative feasible, it being understood that as the electrons are in motion, and must be considered as a cloud, with the exact location not fixed. Hence, a compound is not fully represented by any static structural formula.

A review of the literature, including history and nomenclature, appears in "The Furoxans," J. V. R. Kaufman and J. P. Picard, Chem. Reviews 59, 429 (1959).

The bis compound, without a bridge group, namely 5,5'-bisbenzofurazan 3,3'-dioxide is disclosed by A. G. Green and F. M. Rowe, J. Chem. Soc. (London), 103, 2023 (1913), at page 2025.

Benzofurazan 3-oxide has the formula and numbering:

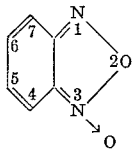

Usage places the dative bonded oxygen in the 3 position, with other substituents in the lowest numbered position. In unsubstituted compounds at least, the 5 and 6 positions appear equal, as do the 4 and 7. The dative bonded oxygen appears to be labile and behaves as if at either position 1 or 3, and hence could be named as 1-oxide, 3-oxide or N-oxide.

Formulae and nomenclature in the field are somewhat of a state of flux. If later theory indicates a different structural representation to be more informative, the present inventors incorporate any such theoretical changes, as it is the compounds themselves, and their usage, that are the present invention, and not a structural representation of such compounds.

Compounds having a single six membered carbocyclic ring having one, two or three furazan oxide substituents as dry cell depolarizers are disclosed in United States Patent 3,163,561, W. B. Hardy and R. A. Parent, "Dry Cell With Benzofuroxan Compound Depolarizer," December 29, 1964.

The requirements for dry cells are many and varied. Some of the requirements seem at least in part inconsistent at least to the extent that in the present state of the art no one dry cell can be prepared which is most serviceable under all conditions. In general, it is desired that dry cells have more energy per cell, have improved shelf life, that is the cell may be stored at room temperature or higher for a long time without undue degradation; that the cell have a flat discharge voltage, that is the voltage when first put into service and the voltage when nearing the end of its useful life be nearly the same; that the cell have a low internal impedance as well as a low D.C. resistance; that the cell be essentially leakproof; that the cell be reasonably effective at room temperature, at high temperatures which may be attained by electronic gear and at low temperatures such as winter conditions in northern climates, and the output voltage and current be independent of temperature.

Many dry cells are used for low drain applications and the depolarizer of the present invention is particularly advantageous for low drain applications in cells having a zinc anode and a manganous chloride electrolyte. The polybenzofurazan oxides of the present invention are comparatively water insoluble and react slowly in dry cells. Therefore, dry cells containing these compounds are particularly advantageous under service which requires low drain. At drains of the order of 10 milliamps per cell and less the present depolarizers appear particularly advantageous and give long life and maximum energy. Such usage is becoming more important as much transistorized equipment is essentially low drain. While low cost is desirable, long service life and reliability under a wide range of conditions are relatively becoming more important.

Dry cells are composed in general of the following elements: an anode, usually in the form of a cup made from a metal high in the electromotive series, such as zinc or magnesium and/or alloys thereof; a rod of carbon or other inert material to serve as a collector of electrons; a mixture usually referred to as the "cathode" or "black" mix; and a separator, often a cellulosic sheet to separate the cathode mix from direct contact with the anode. Such a "mix" comprises carbon, a depolarizer and an electrolyte, the latter being generally a concentrated aqueous salt solution.

The voltage of a dry cell, its life under various discharge rates, and maintenance of a satisfactory minimum voltage during a large part of its life are important factors. Some form of cathode depolarizer is necessary to absorb electrons from the external circuit and thereby maintain a usable cell voltage. Cathode depolarizers are also oxidizers. For many decades the standard cathode depolarizer has been manganese dioxide. In order to obtain satisfactory distribution and conductivity, the manganese dioxide is mixed intimately with finely-divided carbon to produce the black mix which surrounds the carbon positive or collector.

While inorganic depolarizers such as manganese dioxide are operative and have been standard for many decades, they are by no means ideal. Extensive investigations have sought to develop better depolarizers. As a result, a number of organic compounds have been proposed which are superior to manganese dioxide in certain aspects. Requirements of cells vary according to use. Accordingly, different types of organic material have been proposed as depolarizers depending on whether the cell is to be used in slow drain or in fast drain systems. In addition, optimum suitabiliy of an organic material as a depolarizer is found to vary with the metal, or metal alloy, used as the anodic material. In the past, compounds which are best suited for magnesium or magnesium alloy anodes have not been found suitable with zinc anodes.

For best performance in batteries, materials are desired which give both a high initial voltage and a flat discharge curve with time, i.e., discharge accompanied with a minimum drop of voltage with time. Below a certain fixed voltage, the cell becomes unusable even though there may still be considerable energy present although not available as useful energy. In evaluating cells, a certain voltage is usually taken as a cut-off point below which the energy present is not considered available.

In evaluating cells, a common method of comparison is to note the initial voltage and then determine the time required at a particular discharge rate (which simulates the discharge in its anticipated use) to reach a certain cut-off voltage point below which the battery is considered inoperative. For example, for a 1.5 volt cell, the cut-off point may be in the range of from about 0.9 down to about 0.65 volt. Illustratively, a cut-off voltage of 0.65 volt may represent a practical voltage figure below which the battery ordinarily becomes inoperative with portable electronic equipment. With a flat discharge curve above this voltage, a more uniform voltage is supplied over a normal period of time before the cell becomes inoperative. Thus, a practical advantage is obtained in that portable electronic equipment such as a transistor radio operates more uniformly over longer periods.

For transistor radio work, the internal impedance of the battery is an important consideration. Many circuits for such radios use a single battery, and the comparatively heavy current drain by the output stage couples back through the battery, giving a positive feedback. As the signal increases in the output stage, the voltage drops across earlier stages, the overall gain is reduced, the signal drops, the battery voltage increases, and the cycle repeats. Frequently the circuit constants are such that the set "motor-boats," that is gives off a "put-put" sound at a frequency of from one to a dozen cycles per second. Special decoupling networks in the set are designed to minimize such power supply regeneration. A low impedance in the battery is most effective. The low impedance obtained with the present depolarizers is a unique and unexpected bonus in this feature.

Active life of a cell is determined by the amount of current discharged before the cut-off voltage point is reached. From discharge curves, the energy output of the cell may be determined, for example, expressed as watt-hours per pound of cell to a particular voltage cut-off. Energy per unit weight is an important figure, for example in missiles for military use. Here weight and size in relation to the energy output are important factors and a lightweight cell which lasts longer in operation in comparison with a heavier cell is a great advantage. Naturally, to be useful the cell must show a voltage sufficient to operate the equipment which it is to serve. For one reason or another, previously-proposed organic depolarizers did not prove wholly satisfactory for the cells meeting these requirements, particularly when using certain otherwise advantageous anode material, such as zinc.

It is, therefore, the object of the present invention to provide a type of organic material suitable for use as a depolarizing agent which permits more closely meeting the several requirements of an optimum cell. In particular, it should provide a compound which is applicable for use without being as critically limited as to the type of anode metal or as to the intended drain rate.

These objects have been suprisingly well accomplished by the use of polybenzofurazan oxides. These give excellent performance as organic depolarizers in cathodic mixes for dry cells.

Unlike many previously-proposed compounds, use of the present compounds as depolarizers is not necessarily limited to a particular type of cell such as one having a zinc or magnesium alloy anode. A distinguishing feature of the depolarizers of this invention, however, is their extraordinarily high utility in a cell having a zinc anode and a manganous chloride electrolyte in low drain service.

The highly satisfactory results obtained with the present invention are quite unexpected from another point of view. Organic depolarizers found in the past to give the best results have been various nitro and nitroso derivatives. Thus, the superior properties of the new depolarizer, i.e., one having a different kind of heterocyclic system, could not be predicated on a review of the art. Therefrom, it is quite unexpected that the polybenzofurazan oxides are useful in both zinc and magnesium anode types of batteries.

The drawing illustrates the discharge characteristics of various cells according to the invention as compared to the discharge characteristics of a conventional cell having a manganese dioxide depolarizer.

In using the polybenzofurazan oxide compounds of this invention as a cathodic depolarizer, the compound customarily is mixed with a carbon black, preferably one with a high surface area. In general, the cathodic mix, which includes the depolarizer, carbon and an electrolyte, may contain from about 10 to about 50% of the polybenzofurazan oxide. The cathodic mixes are used in assembling test batteries by conventional means.

In general, the testing procedure involves discharging so-prepared batteries through a 150 ohm and/or a 4 ohm resistor, measuring the voltage until the predetermined voltage cut-off point is reached. These values are used for test results as they are standard tests in the battery industry. Other values may be used. The 4 ohm resistor gives a drain of about 375 milliamperes, with a 1.5 volt cell, which is representative of flashlight usage. Flashlights using C and D cells usually are designed for about 300 milliampere or 500 milliampere bulbs. The 150 ohm test resistor gives a starting drain of 10 milliamperes; which is representative of the loads of transistorized receivers. Some hearing aids, and other equipment use a smaller drain. The present polybenzofurazan oxides give comparatively superior results at smaller drains, so a 1000 or 1500 ohm test resistor would show even greater advantages as compared with conventional manganese dioxide depolarizer cells. The standard tests are used, both to give results more easily compared with industry standards, and to reduce the time required for obtaining data. Intermittent loads, and loads after long shelf storage at room temperature, 20° C. or 25° C., or higher, and lower temperatures show advantages achieved with the present novel depolarizers in cells. The full advantages of long life necessarily requires a long period to evaluate and cannot be fully exemplified without undue delay in making the advantages of the present invention available to the public.

While cathodic mixes containing polybenzofurazan oxides may be used in batteries having zinc, magnesium or magnesium alloy anodes with satisfactory results, the uniquely useful results are obtained using zinc anodes which are presently standard in the industry, and these are used below as illustrative, as representing the most readily exploitable field.

The same is true of various electrolyte salts. Useful results are obtained using polybenzofurazan oxide depolarizers with various known electrolytes, both at high and low drain rates. However, as noted above, the most practical results are obtainable through use of an $MnCl_2$ electrolyte. Most effective use also is obtained in service use under slow drain, i.e., discharge through a resistance of about 150 ohm per cell or more. Accordingly, also, these will be taken as illustrative in the following discussion.

An illustrative cell of this invention, i.e., one containing the polybenzofurazan oxide-$MnCl_2$ cathode mix and having a zinc anode is unique. It is superior in many respects.

Outstanding among these are the following:

(1) Long life to voltages above 0.9 volt;
(2) Long life to voltages above 0.65 volt;
(3) Flatter discharge curve over an extended period, i.e., good voltage regulation;
(4) Greater energy per cell to any cut-off voltage below 0.8 volt;
(5) Higher total energy output, approximately 20–50%, over a zinc-manganese dioxide cell of comparable size.

The new compounds of the invention comprise benzofurazan 3-oxide derivatives with more than one benzofurazan 3-oxide moiety linked together through a bridging linkage of valence $x$, where $x$ is an integer from 2 to 4.

An alternate representation of the benzofurazan oxide compound is by the formula:

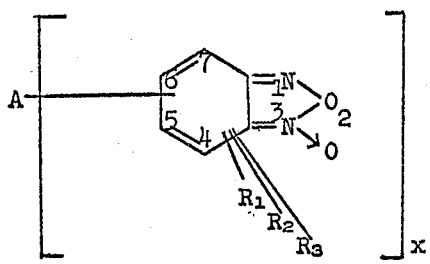

where $R_1$, $R_2$ and $R_3$ are singly each selected from the group consisting of hydrogen, lower alkyl, lower alkoxy, chloro and nitro radicals, and any two adjacent are a second furazan ring; and A is a bridging linkage having $x$ valence bonds each linked to separate benzo rings, and $x$ is a small whole number not less than 2 and not greater than 4.

The bridging linkages are exemplified by the following where each valence bond shown open is attached to the benzene ring of a benzofurazan 3-oxide group:

Sulfone
—$SO_2$—

Carbonyl
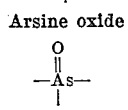

Azo
—N=N—

Ether (oxy)
—O—

Phosphinylidyne (phosphine oxide)

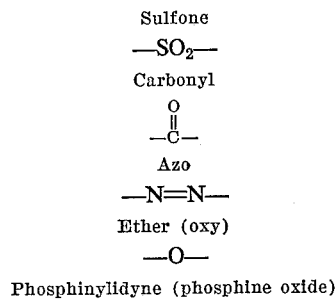

Arsine oxide

Structures only are indicated for the following groups:

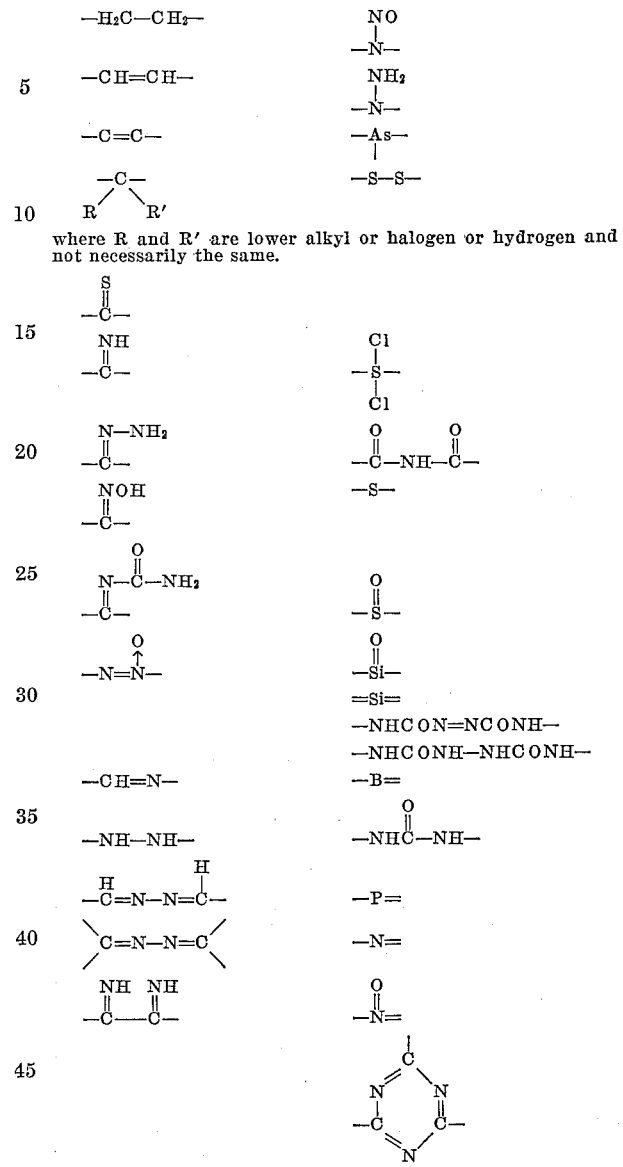

where R and R' are lower alkyl or halogen or hydrogen and not necessarily the same.

For those compounds having more than one furazan ring attached to a single benzene ring, caution in synthesis and handling is advised, as the compounds tend to decompose with explosive violence. In dry cells, the admixed carbon and electrolyte reduce the risk of explosion.

The battery mix includes the above-named compounds, as well as the compounds where A is absent, and the benzene rings are directly linked, the simplest of which is 5,5'-bisbenzofurazan 3,3'-dioxide

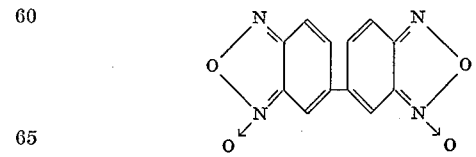

Representative of compounds which give good results in dry cells, and are readily synthesized, are:

5,5'-sulfonylbisbenzofurazan 3,3'-dioxide,
5,5'-bisbenzofurazan 3,3'-dioxide,
5,5'-methylenebisbenzofurazan 3,3'-dioxide,
5,5'-carbonylbisbenzofurazan 3,3'-dioxide,
5,5'-azobisbenzofurazan 3,3'-dioxide,
5,5'-oxybisbenzofurazan 3,3'-dioxide, 5,5′-5″-phosphinylidynetribenzofurazan 3,3′-dioxide, and 5,5′,5″-arsineoxidetrisbenzofurazan 3,3′-dioxide.

There are two general methods which may conveniently be applied for preparation of these compounds. One method involves the azide decomposition of an ortho-nitroazido compound. The other method involves the oxidative ring closure of an ortho-nitro-amino compound, using an oxidizing agent such as sodium hypochlorite.

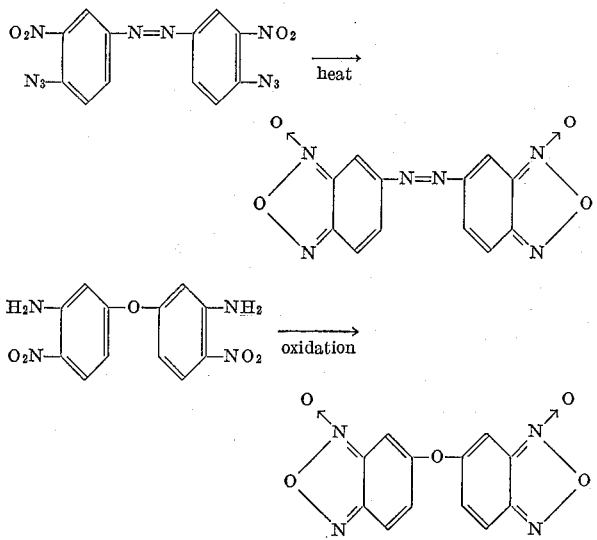

EXAMPLE 1

Preparation of 5,5′-sulfonylbisbenzofurazan 3,3′-dioxide

To a stirred mixture of 300 ml. concentrated $H_2SO_4$ and 250 ml. of 90% nitric acid was added gradually in portions, 50 g. of bis(p-chlorophenyl)sulfone, keeping the temperature between 25 and 40° C. during the addition. The mixture was then stirred at about 60° C. for an hour and after cooling to 55° C., was drowned into about 2 liters of cracked ice. The white precipitate which formed was removed by filtration and dried. This was then recrystallized from 750 ml. of glacial acetic acid giving a 55 g. of bis(4-chloro-3-nitrophenyl) sulfone with a melting point of 196 to 198° C.

The chloro-nitro compound was then converted to the azido-nitro compound. A solution of 34.8 g. of bis(4-chloro-3-nitrophenyl)sulfone in 200 ml. of dimethylsulfoxide was treated dropwise with 20 ml. of water at 38 to 40° C. To this thin slurry which formed was then added at this temperature 14.4 g. sodium azide in portions over one-half hour. The yellow-orange slurry which slowly formed was then stirred at 35 to 37° C. for about three hours and was then poured into a liter of cold water. The solid which formed was isolated by filtration, washed with water and dried giving the bis(4-azido-3-nitrophenyl) sulfone (34 g.) as a yellow solid (M.P. 112–113° C., dec.).

To 40 ml. of toluene was added 20 g. of the azide compound prepared above. The mixture was warmed on a steam bath for about three hours, with evolution of nitrogen; during the first one-half hour, the evolution of nitrogen took place to such an extent that there was considerable bubbling and foaming. The mixture was then chilled and the solid product was isolated by filtration, washed and dried giving 5,5′-sulfonyl-bis-benzofurazan 3,3′-dioxide (16 g.) as a yellow solid (M.P. 207–209° C.).

Other methods of preparation may be used if desired. The compound per se, however, is believed to be new, novel and useful, and as such constitutes a part of the present invention.

In preparing cells of the present invention, conventional procedures are applied as to the carbon collector, metal anode cup, separator, and the like. A cathodic mix is made up using the polybenzofurazan oxide depolarizer and a carbon black. Various types of blacks may be used, but to obtain best results, the carbon black, or mixture of carbon blacks, should have the following properties: (1) high surface area, (2) good electrolyte retention, (3) good conductivity. The maximum weight ratio of polybenzofurazan oxide to carbon black should be about 2:1, the lower limiting ratio being about 1:2. The depolarizer is finely divided to insure a large surface area. The more insoluble compounds are more finely subdivided. As to the electrolyte, $MnCl_2$ or a combination of $MnCl_2$ and $ZnCl_2$ is used to obtain excellent results.

EXAMPLE 2

Preparation of dry cell

The electrolyte is used as a concentrated aqueous solution. Where $MnCl_2$ is to be used alone, a substantially saturated or about 60% aqueous solutions of $MnCl_2$ is desirable. If so desired, various amounts of ammonium chloride and/or zinc chloride may be substituted for part of the manganous salt. However, we prefer that forty percent or more of the total chloride salt content should be the manganous salt. Again, these should be used as substantially saturated aqueous solutions.

Battery compositions of the present invention are made up generally according to procedures well known in the art. A typical formulation is as follows.

| Component: | Grams |
|---|---|
| Carbon black | 0.8–1.1 |
| Depolarizer | 1.3–1.8 |
| Electrolyte [1] | 3.5–4.1 |

[1] At least one-half of the salt being $MnCl_2$.

Discharge characteristics of the cells are determined by conventional means and the results are conveniently expressed by curves, plotting closed circuit voltage against time. The energy output of each particular cell may also be calculated for comparison of cell performance.

Superiority of the new cell may be shown by discharge curves as mentioned above; or in a table indicating time elapsed to certain voltage level and energy delivered in watt hours to certain predetermined cut-off voltage.

The depolarizer, illustrated for example by 5,5′-sulfonylbsibenzofurazan 3,3′-dioxide is dry mixed with carbon black for 2–3 minutes and the aqueous electrolyte solution then is added. The system is then thoroughly mixed until all the electrolyte solution is taken up by the dry mix. The resulting uniform mixture is called the cathode mix.

An "AA" size zinc can is prepared by lining the inner surface with a low resistance separator paper, such as kraft paper, such that about ¼″ of paper protrudes from the edge of the can. The cathode mix is added in small portions and tamped down firmly with a glass rod. After filling the cell, a carbon rod with a brass cap (the "collector") is inserted concentrically into the mix, the protruding paper is folded over to enclose the mix, a paper washer is placed over the top of the enclosed mix and a top seal is made with hot wax.

A size "AA" zinc can is about ½″ in diameter and 1⅞″ long, so the finished cell is not over ³⁵⁄₆₄″ in diameter and 1³¹⁄₃₂″ long.

Testing procedure

Resultant cells are tested by discharging them continuously through a 150 ohm resistor until the closed circuit voltage of the cell drops below 0.65 volt. The voltage measurements are made up with a D.C. voltmeter having an accuracy of 0.25% of full scale and full scale ranges of 1 volt and 2 volts with a resistance of 5000 ohms per volt.

Formulation

According to the procedure described above, "AA" size cells of various types are purchased or prepared for comparative testing using the following formulations.

*Type A.*—A commercially-available, paper-lined, zinc anode cell using a manganese dioxide depolarizer and an ammonium chloride (20%) zinc chloride (33%) water (47%) electrolyte.

*Type B.*—A zinc anode cell using benzofurazan 3-oxide (benzofuroxan) as the depolarizer and the electrolyte of Type A in the following mix:

| | Parts |
|---|---|
| Carbon black | 1.10 |
| Benzofurazan 3-oxide | 1.30 |
| Electrolyte | 3.63 |

*Type C.*—A zinc anode cell using the benzofurazan 3-oxide depolarizer of Type B but an $MnCl_2 \cdot 4H_2O$ (53%) $ZnCl_2$ (10%) water (37%) electrolyte in the following cathode mix:

| | Parts |
|---|---|
| Carbon black | 1.1 |
| Benzofurazan 3-oxide | 1.3 |
| Electrolyte | 4.1 |

*Type D.*—A zinc anode cell using 5,5'-sulfonylbisbenzofurazan 3,3'-dioxide as the depolarizer and the electrolyte of Type A in the following mix:

| | Parts |
|---|---|
| Carbon black | 1.10 |
| 5,5'-sulfonylbisbenzofurazan 3,3'-dioxide | 1.30 |
| Electrolyte | 3.63 |

*Type E.*—A zinc anode cell using 5,5'-sulfonylbisbenzofurazan 3,3'-dioxide as the depolarizer and the electrolyte of Type C in the following mix:

| | Parts |
|---|---|
| Carbon black | 1.10 |
| 5,5'-sulfonylbisbenzofurazan 3,3'-dioxide | 1.30 |
| Electrolyte | 3.63 |

*Type F.*—A zinc anode cell using 5,5'-sulfonylbisbenzofurazan 3,3'-dioxide as the depolarizer and the electrolyte of Type C in the following mix:

| | Parts |
|---|---|
| Carbon black | 0.88 |
| 5,5'-sulfonylbisbenzofurazan 3,3'-dioxide | 1.76 |
| Electrolyte | 3.54 |

Illustrative test results are shown in the following table showing hours to reach the indicated voltage and the energy in watt hours per cell to reach the indicated voltage.

TABLE

| Type | Energy/Cell (Watt Hours) | | Life/Cell (Hours) | | |
|---|---|---|---|---|---|
| | 0.8 v. | 0.65 v. | 0.9 v. | 0.8 v. | 0.65 v. |
| A | 1.14 | 1.24 | 104 | 117 | 144 |
| B | .62 | .84 | 65 | 102 | 160 |
| C | .82 | .95 | 54 | 135 | 182 |
| D | .80 | .93 | 62 | 136 | 169 |
| E | 1.34 | 1.37 | 160 | 244 | 247 |
| F | 1.61 | 1.88 | 220 | 280 | 337 |

Discharge curves plotting closed circuit voltage against time in hours are shown in the accompanying drawing wherein the several curves are identified by the same letter as the cell type in the table above.

From the foregoing table and the discharge curves it may be readily seen that a typical zinc anode cell (Type A) using $MnO_2$ and a standard Leclanché electrolyte does have a high initial voltage but poor voltage control and relatively short service life. Substitution of benzofurazan 3-oxide, one of the best previously-proposed organic electrolytes, as in Type B, improves voltage control somewhat, but the service life is not greatly extended. Additional substitution of an $MnCl_2$ electrolyte (Type C) does not produce any appreciable improvement over Type B showing use of the manganese salt electrolyte is not alone responsible for marked improvement.

Substitution of 5,5'-sulfonylbisbenzofurazan 3,3'-dioxide as the depolarizer in a Leclanché electrolyte cell (Type D) does produce a marked improvement over the $MnO_2$ or benzofurazan 3-oxide Leclanché electrolyte cells (Types A and B). It also improves the voltage control as compared with the benzofurazan 3-oxide-$MnCl_2$ electrolyte cell (Type C). However, nothing in the prior art cells (Types A, B and C) would lead one to expect the completely unexpected improvements shown by Types E and F in which the 5,5'-sulfonylbisbenzofurazan 3,3'-dioxide depolarizer of this invention is combined with a manganese salt electrolyte.

EXAMPLE 3

*Preparation of 5,5'-bisbenzofurazan 3,3'-dioxide*

A 100 g. crude sample of 3,3'-dinitrobenzidine (M.P. 248–263°) was purified by slurrying with 500 ml. of hot concentrated hydrochloric acid, filtering hot, reslurrying the wet cake in two liters of water, filtering and washing with water; yield: 96 g., M.P. 261–263°. 54 g. of this material was then recrystallized from 400 ml. of phenol to yield 42 g. of scarlet needles, M.P. 272–273° (literature 275°).

A solution of 27.4 g. (0.1 mole) of the recrystallized dinitrobenzidine in 200 ml. of concentrated sulfuric acid was poured over ice and water, approximately 2 liters, stirred and the finely-divided precipitate was filtered. The cake was washed with approximately one liter of water, sucked damp and then stirred with 100 ml. of 40% caustic. The smooth paste which formed was treated with 110 ml. of approximately 12% sodium hypochlorite and gradually heated over 30 minutes to a gentle boil with stirring. The dark red slurry gradually became lighter and finally turned yellow. During an additional 20 minutes of heating at 95 to 105°, 90 ml. more of the hypochlorite solution was added. The mixture was cooled, filtered and air dried, yielding 23.0 g. (85%) of a yellow solid, M.P. 203–204°, dec. Recrystallization from 400 ml. of chlorobenzene gave 17.5 g. of 5,5'-bisbenzofurazan 3,3'-dioxide, an organic solid, M.P. 201–202°, dec.

EXAMPLE 4

*Preparation of 5,5'-methylenebisbenzofurazan 3,3'-dioxide*

A solution of 100 g. (0.725 mole) of o-nitroaniline in 1200 ml. of ethanol was treated with one liter of water and 54 g. of 37% low-methanol formaldehyde (0.667 mole). The mixture was then distilled at such a rate that approximately four hours were required to collect 930 ml. of distillate. The residue of N,N'-methylenebis-o-nitroaniline was chilled, filtered and air dried, yielding 99 g. (94.7%) of a yellow solid, M.P. 187–189°.

A slurry of 91 g. of this material and 910 g. (765 ml.) of concentrated HCl was heated on the steam bath for 1.5 hours during which time a gentle stream of hydrogen chloride gas was bubbled into the mixture. After cooling to room temperature, the mixture was again saturated with hydrogen chloride gas and then allowed to stand for one week. The precipitate was filtered at room temperature and the damp cake was heated to boiling in one liter of water, filtered hot and the cake first air, then oven dried at 60° C., yielding 62 g. (68%), M.P. 222–226°, of 4,4'-diamino-3,3'-dinitrodiphenylmethane.

A warm slurry of 39.2 g. (0.136 mole) of 4,4'-diamino-3,3'-dinitrodiphenylmethane in 600 ml. of a solution of acetic acid/sulfuric acid, 2/1, was cooled in an ice bath to 10° and then sufficient ice was added to the mixture to lower the temperature to approximately 3° (the external temperature being about 2°). Sodium nitrite, 20.0 g. (0.29 mole), was then added in portions at 2–4° over one-half hour (ice being added when necessary) and the mixture was stirred for an additional three-quarters of an hour at 0±2°, filtered and the stirred purple-colored solution after being cooled to 0° was treated with a solution of 18.8 g. of sodium azide in 60 ml. of water. The mixture foamed a little and the stirring at 0–5° was continued for 20 minutes followed by filtration and water washing. The air-dried 4,4'-diazido-3,3'-dinitrodiphenylmethane weighed 40 g. (86.5%), and melted 118–119°, dec.

A mixture of 20 g. of this diazide and 40 ml. of toluene was heated on the steam bath for three hours, cooled, collected and then taken up in 300 ml. of boiling toluene and filtered hot. The filtrate was drowned in hexane and the orange precipitate which formed was isolated, washed with hexane and air dried giving 6.5 g. (38.9%), M.P. 176–178°, dec., of 5,5'-methylenebisbenzofurazan 3,3'-dioxide.

Analogous results are obtained starting with appropriate compounds having as substituents lower alkyl, lower alkoxy and chloro radicals.

EXAMPLE 5

*Preparation of 5,5'-carbonylbisbenzofurazan 3,3'-dioxide*

To a stirred solution of 150 ml. of 90% fuming nitric acid was added 25 g. of 4,4'-dichlorobenzophenone at 5–7°. The green solution which formed was allowed to warm to room temperature, stand overnight and then poured over ice (one-liter beaker ¾ full). The solid was collected, washed with water and dried at 60°, yielding 31.4 g., M.P. 126–130°. Recrystallization from 160 ml. of glacial acetic acid gave 26.6 g., M.P. 129–131°, of 4,4'-dichloro-3,3'-dinitrobenzophenone.

A solution of 17.05 g. (0.05 mole) of 4,4'-dichloro-3,3'-dinitrobenzophenone in 110 ml. of dimethyl sulfoxide and 11 ml. of water was treated portionwise with 8.13 g. (0.125 mole) of sodium azide over a 25 minute period at 40–44°. The mixture, after stirring for an additional 2½ hours, was poured into 500 ml. of water, chilled, filtered, washed with water and air dried. The 4,4'-diazido-3,3'-dinitrobenzophenone weighed 17.7 g. and melted at 116–117°, dec.

A mixture of 15 g. of said diazide and 30 ml. of toluene was heated on the steam bath for 2¼ hours; there was considerable foaming. Chilling, followed by filtration and washing the cake with hexane gave 11.2 g., M.P. 191–193°, dec., of 5,5'-carbonylbisbenzofurazan 3,3'-dioxide.

EXAMPLE 6

*Preparation of 5,5'-oxybisbenzofurazan 3,3'-dioxide*

A mixture of 50 g. of p-nitrophenyl ether, 200 ml. dimethylformamide and 2 g. of 10% palladium on carbon was hydrogenated in a Parr apparatus. The total hydrogen absorption was 105 p.s.i., theory 92 p.s.i.. The mixture was filtered to remove the catalyst and the filtrate drowned in water. The white solids after filtering, washing with water and oven drying at 60° yielded 35.5 g., M.P. 184–185°, of p-aminophenyl ether.

The 4,4' diaminodiphenyl ether (p-aminophenyl ether) thus produced was acetylated by treating 35 g. (0.175 mole) in 160 ml. of 3/2.2 (by volume) acetic acid/water at 0° with 36.3 ml. (0.39 mole) of acetic anhydride. The solution immediately solidified and a 20° heat of reaction was observed. The mixture was then heated to 90° with stirring, whereupon a thin slurry formed, and after heating a few minutes at this temperature was allowed to cool to room temperature, filtered and washed with water, yielding 46 g. of the diacetylated p-aminophenyl ether.

A mixture of 20 g. (0.7 mole) of the thus acetylated p-aminophenyl ether and 400 ml. of glacial acetic acid was cooled to 17° and then 100 ml. of concentrated sulfuric acid was added at 15–25°. The addition of the sulfuric acid caused a dark red solid to precipitate which finally redissolved by the time all the sulfuric acid was added. To this solution was added at approximately 15°, 9.5 ml. (0.15 mole) of 70% nitric acid; no heat of reaction was noticed and the mixture was allowed to stir at 10 to 20° for three hours and then at room temperature overnight. The solution was drowned in ice water, filtered, washed with water and steam oven dried at 60° for 48 hours, yielding 25 g., M.P. 194–199° (96% yield), of 4,4'-diacetylamino-3,3'-dinitrodiphenyl ether.

The deacetylation was carried out by taking 15 g. of the nitrated material and heating with 250 ml. of Claisen's alkali for three-quarters of an hour on the steam bath. (The Claisen's alkali was prepared by taking 88 g. (1.57 moles) of potassium hydroxide, dissolving in 63 ml. of water and then diluting the cooled solution to 250 ml. with methanol.) The tarry material which formed was drowned in water, filtered and recrystallized from acetic acid. The washed, oven dried material obtained after filtration and washing with ether, yielded 5.0 g., M.P. 205–207°, of 4,4'-diamino-3,3'-dinitrophenyl ether.

A 4.5 g. portion of 4,4'-diamino-3,3'-dinitrodiphenyl ether, prepared as above, was added to a solution of 10 g. of sodium hydroxide in 150 ml. of alcohol and the mixture was cooled to 0°. To this cold solution was added 23 ml. of approximately 14% sodium hypochlorite in portions at 0–5°. The rate of addition was controlled by the time taken to change from the initial red color back to the brownish-orange color of the starting material. The mixture was then stirred for one hour in the cold, and the yellow-brown suspension was filtered, washed well with water and dried in vacuo at 55°, giving 3.7 g., M.P. 165–170° (84% yield), of 5,5'-oxybisbenzofurazan 3,3'-dioxide. Recrystallized from acetic acid and ethanol, a more highly purified sample melted at 170–172°.

EXAMPLE 7

*Preparation of 5,5'-azobisbenzofurazan 3,3'-dioxide*

A solution of 50 g. (0.29 mole) of 3-nitro-4-chloroaniline in 200 ml. of ethanol was cooled to 5° C. and 100 ml. of sodium hypochlorite (approximately 14%) was then added portionwise at 5–10°, over a period of approximately ¾ hour. The slurry of orange precipitate was stirred overnight, filtered and then washed with water and alcohol, yielding 14.5 g., M.P. 213–215°, of 3,3'-dinitro-4,4'-dichloroazobenzene.

A thin slurry of 10.2 g. (0.03 mole) of 3,3'-dinitro-4,4'-dichloroazobenzene, prepared as above, and 125 ml. of dimethylsulfoxide and 12.5 ml. of water at 45° was treated with 4.3 g. (0.066 mole) of sodium azide portionwise. After heating at 45–50° C. for six hours, 45 ml. of dimethylsulfoxide and 5 ml. of water, and 1 g. (0.015 mole) of sodium azide were added. The mixture was then stirred overnight at 43°, drowned in water and the solids collected. The dry cake was thought to be too sensitive to work with and so the wet cake was decomposed in about 200 ml. of toluene on the steam bath. Very little decomposition occurred until the temperature of 80° was reached. When the gas evolution ceased (pot temperature 100°), the dark red toluene solution was decanted away from the solids and drowned in hexane; the yellow-brown solid which precipitated was filtered off and air dried, giving 1.6 g., M.P. 196–197°, dec., of 5,5'-azobisbenzofurazan 3,3'-dioxide.

Additional material may be isolated from the residue from the hot toluene decomposition by extraction with hot acetic acid and precipitation by pouring into water.

EXAMPLE 8

*Preparation of 5,5',5''-phosphinylidynetrisbenzofurazan 3,3',3''-trioxide*

A stirred solution of 17 g. of p-chlorobromobenzene in 70 ml. of anhydrous ether was treated with 9.72 g. (0.4 mole) magnesium turnings and gently warmed to aid the formation of the Grignard; a few magnesium turnings were crushed under a glass rod to aid the process. After about 15 minutes the reaction began and 69 g. of p-chlorobromobenzene in 200 ml. of ether was added at such a rate as to keep the mixture refluxing. The addition required one-half hour and the mixture was stirred at ambient temperature for two hours followed by a final ¾-hour refluxing. The mixture was cooled to 0° and a solution of 18.3 g. (0.12 mole) of redistilled phosphorous oxychloride in 125 ml. of ether was added over 1.5 hours at —2 to +1°. The mixture was then refluxed for two hours and upon cooling was poured over ice (3-liter beaker ⅓ full) containing a little dilute HCl. Approximately 300 ml. of ether was added to the mixture which was stirred and filtered, and the cake washed with ether. The ether filtrate and washings were dried over sodium sulfate and evaporated. The pasty residue was extracted with three 200-ml. portions of petroleum ether (60–90°) and the residue weighed 23.5 g. Recrystallization from 50 ml. of benzene gave 9.2 g., M.P. 166–169°, of tris(p-chlorophenyl)phosphine oxide.

A nitrating solution prepared by cautiously adding 25 ml. of 90% fuming nitric acid to 30 ml. of concentrated sulfuric acid at 25–40° was cooled to 8° and 5 g. (0.013 mole) of tris(p-chlorophenyl)phosphine oxide was added in portions over a one-half hour period. The temperature rose to 29° because of the heat of reaction. The amber solution became light yellow after being heated for one hour at 55–60° and upon cooling to room temperature was poured over ice and water, collected and dried in vacuo at 60°, yielding 6.4 g. (95%), M.P. 188–195°. Recrystallization from 75 ml. of chlorobenzene gave 4.8 g., M.P. 191–192°, of tris(4-chloro-3-nitrophenyl)phosphine oxide.

A stirred solution of 4 g. (0.0075 mole) of tris(4-chloro-3-nitrophenyl)phosphine oxide in 25 ml. of dimethyl sulfoxide and 2.5 ml. of water was treated portionwise at 38–40° with 1.88 g. (0.0279 mole) of sodium azide. After approximately one-half the sodium azide was added, the precipitate which formed became so thick that the magnetic stirrer stopped; addition of 30 ml. more of dimethyl sulfoxide resulted in a stirrable slurry and the remainder of the sodium azide was then added at 37–40°. The mixture was stirred for four hours at 30–35° and then poured into 300 ml. water; the precipitate was collected and dried over $P_2O_5$, yielding 3.8 g. (91.5%) of tris(4-azido-3-nitrophenyl)phosphine oxide. The product decomposes on heating.

A mixture of 3.8 g. of the tris-azide and 22 ml. of decalin was heated to 125° C. for 10 minutes using an oil bath and the cream-colored mixture turned yellow with evolution of gas. After heating at 138–140° for three hours, the mixture was cooled, filtered and washed with hexane giving 2.7 g., M.P. 222° vigorous decomposition, of 5,5',5"-phosphinylidynetrisbenzofurazan 3,3',3"-trioxide.

EXAMPLE 9

*Preparation of 5,5',5"-arseneoxidetrisbenzofurazan 3,3',3"-trioxide*

A solution of 15 g. of tris-p-chlorophenylarsene (0.0366 mole) in 30 ml. of acetone was treated dropwise with 5.2 g. (0.0455 mole) of 30% hydrogen peroxide at 25–30° C. (cooling with ice was required). The solution was stirred for one hour at room temperature following completion of addition and the solvent was then stripped off in vacuo. The white solid tris-p-chlorophenylarsineoxide obtained weighed 15.2 g., M.P. 202–204°.

A nitrating solution was prepared by cautiously adding 38.2 ml. of 90% fuming nitric acid to 46 ml. of concentrated sulfuric acid at 8–35° C., was cooled to 3° and 8.5 g. (0.02 mole) of tris-p-chlorophenylaresene oxide was added in portions over a 10-minute period. The mixture was allowed to warm to 30° and then was heated at 55–60° for one hour and upon cooling to room temperature was poured over ice and water, collected and dried at 60° for 48 hours, giving 16.7 g. (11.2% theory), M.P. 230–232°, of tris(4-chloro-3-nitrophenyl)arsene oxide.

A stirred solution of 5.6 g. (0.01 mole) of tris-(4-chloro-3-nitrophenyl)arsene oxide in 60 ml. of dimethyl sulfoxide and 2 ml. of water was treated portionwise at 38–40° with 2.6 g. (0.04 mole) of sodium azide. After 30 minutes the precipitate which formed was quite heavy, although still stirrable; the mixture was stirred 40–50° for 3 hours and then overnight at 35–40°. The mixture was poured into approximately 5 ml. of ice water and filtered and the cake washed with water. The azide product, 8.5 g. of the wet cake and 30 ml. of o-dichlorobenzene was placed in an oil bath at 135°. The gas evolution began at 80° and continued over the interval from 80 to 105° C. The mixture was heated then at 110 to 130° to 2.5 hours and filtered hot. The cake of 5,5',5",-arseneoxidetrisbenzofurazan 3,3',3"-trioxide weighed 3.2 g., M.P. 226°, with violet decomposition.

EXAMPLE 10

*Cell Tests*

Using the procedure described in Example 2, additional cells were prepared using the polybenzofuran oxide derivatives of Examples 3 to 9. The formulations used are similar to the formulations of "Type B" and "Type C" of Example 2; specifically as follows:

Parts
Carbon black _____ 1.1
Depolarizer _____ 1.3
Electrolyte (53% $MnCl_2 \cdot 4H_2O$, 10% $ZnCl_2$ and
  37% $H_2O$) _____ 3.6 to 4.1

The following table shows the results of these tests with the depolarizers from the examples as indicated, with the energy per cell in watt hours and the life in hours per cell to certain specified cut-off voltages:

TABLE

| Compound of Example No. | Bridging Component | Energy/Cell (Watt Hours) | | Life/Cell (Hours) | |
|---|---|---|---|---|---|
| | | 0.8 v. | 0.65 v. | 0.8 v. | 0.65 v. |
| 3 | None* | 0.94 | 1.31 | 180 | 288 |
| 4 | —CH²— | 0.59 | 0.84 | 120 | 189 |
| 5 | $\overset{O}{\underset{\|}{-C-}}$* | 0.95 | 1.23 | 173 | 243 |
| 6 | —O— | 0.64 | 1.22 | 128 | 293 |
| 7 | —N=N— | 0.41 | 0.57 | 79 | 124 |
| 8 | $\overset{O}{\underset{\|}{-P-}}$* | .99 | 1.23 | 148 | 240 |
| 9 | $-\overset{\|}{\underset{\|}{As}}-$ | 0.75 | .86 | 135 | 165 |

*The presence of atmospheric oxygen often improves the discharge characteristics of each cell. Depending on the sealing material used, some air may leak into the cell. The cells marked above with an (*) were prepared using a sealant which allowed some access to atmospheric oxygen.

We claim:

1. In a dry cell comprising in combination a metallic anode, a cathode composition comprising a mixture of carbon and an organic depolarizer compound and a metal salt electrolyte, the improvement in which organic depolarizer compound is a polybenzozfurazan oxide compound of the formula:

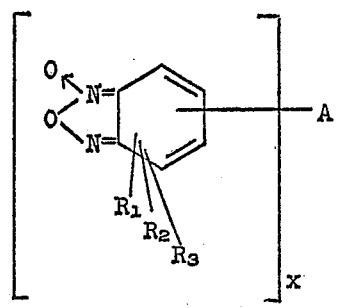

where $R_1$, $R_2$ and $R_3$ are singly each selected from the group consisting of hydrogen, lower alkyl, lower alkoxy, chloro and nitro radicals, and any two adjacent are a second furazan oxide ring; and A is a bridging linkage having $x$ valence bonds each linked to separate benzo rings, and $x$ is a small whole number not less than 2 and not greater than 4.

2. In a dry cell comprising in combination a metallic anode, a cathode composition comprising a mixture of carbon and an organic depolarizer compound and a metal salt electrolyte, the improvement in which the organic depolarizer compound is 5,5'-sulfonylbisbenzofurazan 3,3'-dioxide.

3. In a dry cell comprising in combination a metallic anode, a cathode composition comprising a mixture of carbon and an organic depolarizer compound and a metal salt electrolyte, the improvement in which the organic depolarizer compound is 5,5'-methylenebisbenzofurazan 3,3'-dioxide.

4. In a dry cell comprising in combination a metallic anode, a cathode composition comprising a mixture of carbon and an organic depolarizer compound and a metal salt electrolyte, the improvement in which the organic depolarizer compound is 5,5'-carbonylbisbenzofurazan 3,3'-dioxide.

5. In a dry cell comprising in combination a metallic anode, a cathode composition comprising a mixture of carbon and an organic depolarizer compound and a metal salt electrolyte, the improvement in which the organic depolarizer compound is 5,5'-oxybisbenzofurazan 3,3'-dioxide.

6. In a dry cell comprising in combination a metallic anode, a cathode composition comprising a mixture of carbon and an organic depolarizer compound and a metal salt electrolyte, the improvement in which the organic depolarizer compound is 5,5'-bisbenzozfurazan 3,3'-dioxide.

7. A cell according to claim 1 in which the anode is zinc and in the electrolyte composition at least 50% by weight of the total salt is manganous chloride.

8. A cell according to claim 2 in which the anode is zinc and in the electrolyte composition at least 50% by weight of the total salt is manganous chloride.

9. A cell according to claim 3 in which the anode is zinc and in the electrolyte composition at least 50% by weight of the total salt is manganous chloride.

10. A cell according to claim 4 in which the anode is zinc and in the electrolyte composition at least 50% by weight of the total salt is manganous chloride.

11. A cell according to claim 5 in which the anode is zinc and in the electrolyte composition at least 50% by weight of the total salt is manganous chloride.

12. A cell according to claim 6 in which the anode is zinc and in the electrolyte composition at least 50% by weight of the total salt is manganous chloride.

References Cited by the Examiner

UNITED STATES PATENTS

| | | | |
|---|---|---|---|
| 2,630,438 | 3/1953 | Rosenwald | 252—405 |
| 2,880,122 | 3/1959 | Morehouse et al. | 136—137 |
| 2,980,689 | 4/1961 | Plampin | 260—307.4 |
| 2,992,229 | 7/1961 | D'Amico | 260—307.4 |
| 3,057,760 | 10/1962 | Dereska et al. | 136—137 |
| 3,163,561 | 12/1964 | Hardy et al. | 136—137 |

WINSTON A. DOUGLAS, *Primary Examiner.*

D. L. WALTON, *Assistant Examiner.*